United States Patent
Xu et al.

(10) Patent No.: US 8,798,547 B2
(45) Date of Patent: Aug. 5, 2014

(54) NOISE PADDING TECHNIQUES IN HETEROGENEOUS NETWORKS

(75) Inventors: Hao Xu, San Diego, CA (US); Tingfang Ji, San Diego, CA (US); Renqiu Wang, San Diego, CA (US); Durga Prasad Malladi, San Diego, CA (US); Madhavan Srinivasan Vajapeyam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 345 days.

(21) Appl. No.: 13/084,407

(22) Filed: Apr. 11, 2011

(65) Prior Publication Data

US 2011/0250911 A1    Oct. 13, 2011

Related U.S. Application Data

(60) Provisional application No. 61/323,855, filed on Apr. 13, 2010.

(51) Int. Cl.
  *H04B 1/00*    (2006.01)
  *H04B 15/00*   (2006.01)
  *H04B 7/00*    (2006.01)
  *H04B 7/185*   (2006.01)

(52) U.S. Cl.
  USPC .......................... 455/63.1; 455/522; 370/318

(58) Field of Classification Search
  USPC ........... 455/522, 63.1, 67.11, 67.13; 370/317, 370/318
  See application file for complete search history.

(56) References Cited

U.S. PATENT DOCUMENTS

| | | | |
|---|---|---|---|
| 8,315,583 B2* | 11/2012 | Stelliga et al. ................. | 455/296 |
| 2004/0152431 A1* | 8/2004 | Johnson ......................... | 455/130 |
| 2007/0155395 A1* | 7/2007 | Gopalakrishnan et al. ... | 455/453 |
| 2007/0165753 A1* | 7/2007 | Yang .............................. | 375/346 |
| 2007/0218847 A1* | 9/2007 | Cho et al. ...................... | 455/102 |
| 2008/0219371 A1* | 9/2008 | Hong et al. .................... | 375/260 |
| 2008/0227477 A1* | 9/2008 | Dayal et al. .................... | 455/522 |
| 2008/0299932 A1* | 12/2008 | Belogolovy et al. .......... | 455/296 |
| 2009/0061886 A1* | 3/2009 | Cozzo et al. ................... | 455/450 |
| 2009/0286563 A1 | 11/2009 | Ji et al. | |
| 2011/0199945 A1* | 8/2011 | Chang et al. ................... | 370/281 |
| 2012/0238311 A1* | 9/2012 | Takahashi ....................... | 455/522 |
| 2013/0114450 A1* | 5/2013 | Xu et al. ......................... | 370/252 |

OTHER PUBLICATIONS

Huawei: "Enhanced ICIC and Resource-Specific CQI Measurement", 3GPP Draft; R1-101981, 3rd Generation Partnership Project (3GPP), Mobile Competence Centre ; 650, Route Des Lucioles ; F-06921 Sophia-Antipolis Cedex ; France, vol. RAN WGI, no. Beijing, china; Apr. 12, 2010, Apr. 6, 2010, XP050419318, [retrieved on Apr. 6, 2010].
International Search Report and Written Opinion—PCT/US2011/032345, ISA/EPO—Jul. 21, 2011.

(Continued)

*Primary Examiner* — Andrew Wendell
(74) *Attorney, Agent, or Firm* — Dalei Dong

(57) ABSTRACT

A method of wireless communication includes detecting uplink interference in a received uplink transmission of a user equipment. The received uplink transmission is padded with noise based on the detected interference and also based on a frequency domain partition, whether a subframe is protected, and/or a user equipment type.

22 Claims, 8 Drawing Sheets

(56) References Cited

OTHER PUBLICATIONS

Qualcomm Europe: "Carrier Aggregation in Heterogeneous Networks", 3GPP Draft; R1-092239, 3rd Generation Partnership Project (3GPP), Mobile Competence Centre; 650, Route Des Lucioles; F-06921 Sophia-Antipolis Cedex; France, no. San Francisco, USA; May 8, 2009, XP050339658, [retrieved on May 8, 2009].

Qualcomm Europe: "HNB and Macro Uplink Performance with Adaptive Attenuation at HNB", 3GPP Draft; R4-081345, 3rd Generation Partnership Project (3GPP), Mobile Competence Centre ; 650, Route Des Lucioles ; F-06921 Sophia Antipolis Cedex ; France, vol. RAN WG4, no. Munich, Germany; Jun. 10, 2008, XP050179936, [retrieved on Jun. 10, 2008].

* cited by examiner

NOISE PADDING TECHNIQUES IN HETEROGENEOUS NETWORKS

CROSS-REFERENCE TO RELATED APPLICATION

This application claims the benefit under 35 U.S.C. §119(e) to U.S. Provisional Patent Application Ser. No. 61/323,855 entitled "NOISE PADDING TECHNIQUES IN HETEROGENEOUS NETWORKS (HETNET)," filed on Apr. 13, 2010, the disclosure of which is expressly incorporated by reference herein in its entirety.

BACKGROUND

Field

Aspects of the present disclosure relate generally to wireless communication systems, and more particularly to noise padding techniques in a heterogeneous wireless communication network.

BACKGROUND

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one embodiment, a method of wireless communication is disclosed. The method includes detecting uplink interference in a received uplink transmission of a user equipment. The received uplink transmission is noise padded based on the detected interference and also based on a frequency domain partition, whether a subframe is protected, and/or a user equipment type.

In another embodiment, a method for virtual noise padding in wireless communication is disclosed. The method includes detecting uplink interference and calculating an increased interference based on the detected interference. A power control command and/or a rate control command is directly signaled to a user equipment in response to the calculated interference.

In an embodiment, an apparatus is disclosed. The apparatus includes means for detecting uplink interference in a received uplink transmission of a user equipment. The apparatus also includes means for noise padding the received uplink transmission based on the detected interference and based on a frequency domain partition, whether a subframe is protected, and/or a user equipment type.

In another embodiment, an apparatus for virtual noise padding in wireless communication is disclosed. The apparatus includes means for detecting uplink interference and means for calculating an increased interference based on the detected interference. A means for directly signaling to a UE a power control command and/or a rate control command in response to the calculated interference is also included.

In another embodiment, a computer program product for wireless communications in a wireless network is disclosed. A computer readable medium has program code recorded thereon which, when executed by one or more processors, cause the one or more processors to perform operations of detecting uplink interference in a received uplink transmission of a user equipment. The program code also causes the one or more processors to noise pad the received uplink transmission based on the detected interference and based on a frequency domain partition, whether a subframe is protected, and/or a user equipment type.

Another embodiment discloses a computer program product for virtual noise padding in wireless communication. A computer readable medium has program code recorded thereon which, when executed by one or more processors, cause the processor(s) to perform operations of detecting uplink interference and calculating an increased interference based on the detected interference. The program code also causes the processor(s) to directly signal to a UE a power control command and/or a rate control command in response to the calculated interference.

Another embodiment discloses a system for wireless communication having a memory and at least one processor coupled to the memory. The processor(s) is configured to detect uplink interference in a received uplink transmission of a UE (user equipment). The processor is also configured to noise pad the received uplink transmission based on the detected interference and based on a frequency domain partition, whether a subframe is protected, and/or a user equipment type.

In another embodiment, a system for virtual noise padding in wireless communication is disclosed. The system has a memory and at least one processor coupled to the memory. The processor(s) is configured to detect uplink interference and to calculate an increased interference based on the detected interference. The processor is further configured to directly signal to a UE a power control command and/or a rate control command. in response to the calculated interference.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
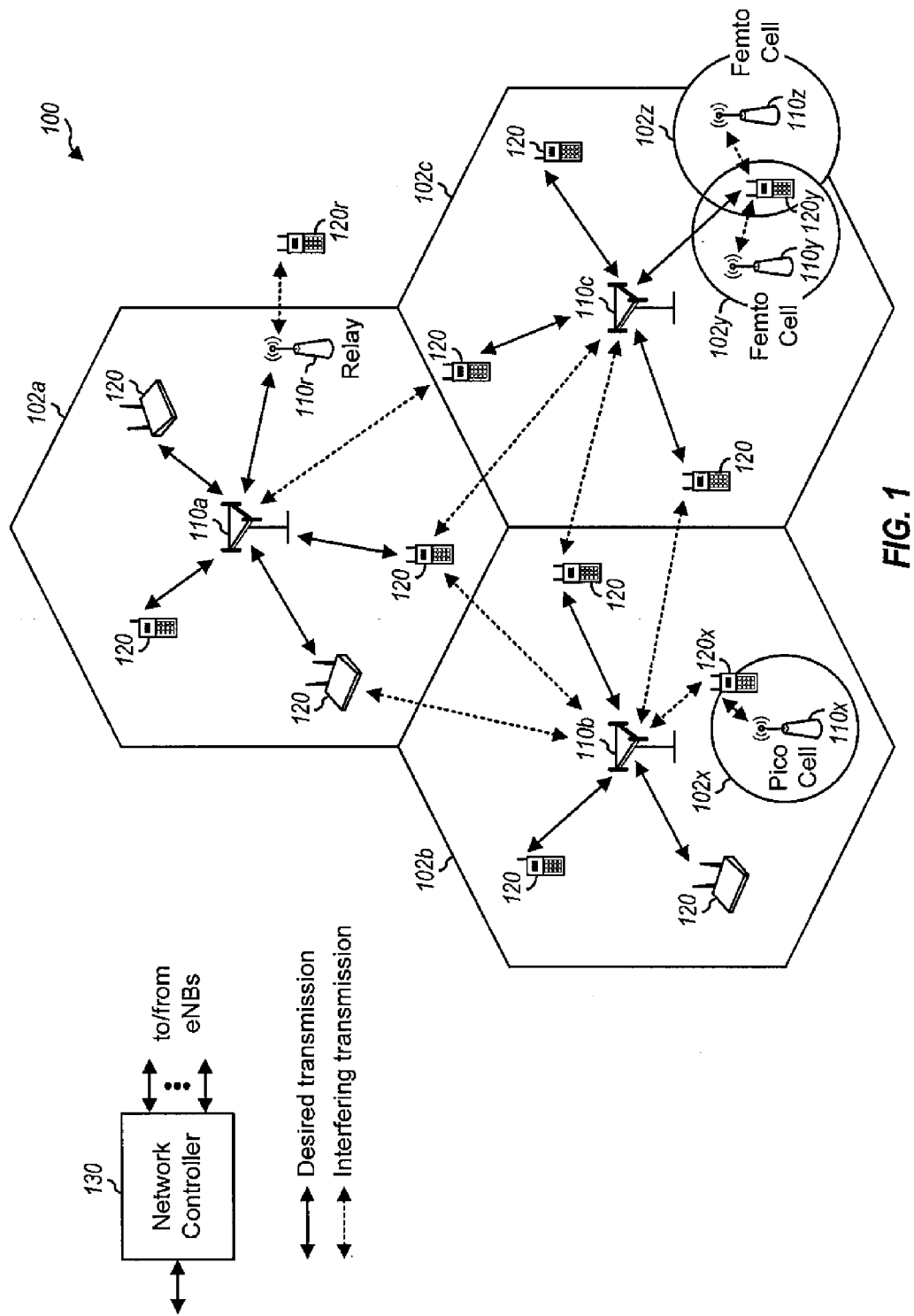
FIG. 1 is a block diagram conceptually illustrating an example of a telecommunications system.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

FIG. 1 shows a wireless communication network 100, which may be an LTE-A network. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell.

A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. And, the eNodeBs 110y and 110z are femto eNodeBs for the femto cells 102y and 102z, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB or a UE) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for either synchronous or asynchronous operations.

In one aspect, the wireless network 100 may support Frequency Division Duplex (FDD) or Time Division Duplex (TDD) modes of operation. The techniques described herein may be used for either FDD or TDD mode of operation.

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via a wireless backhaul or a wireline backhaul.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, a tablet, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz (i.e., 6 resource blocks), and there may be 1, 2, 4, 8 or 16 sub-bands for a corresponding system bandwidth of 1.25, 2.5, 5, 10 or 20 MHz, respectively.

Figure 2:
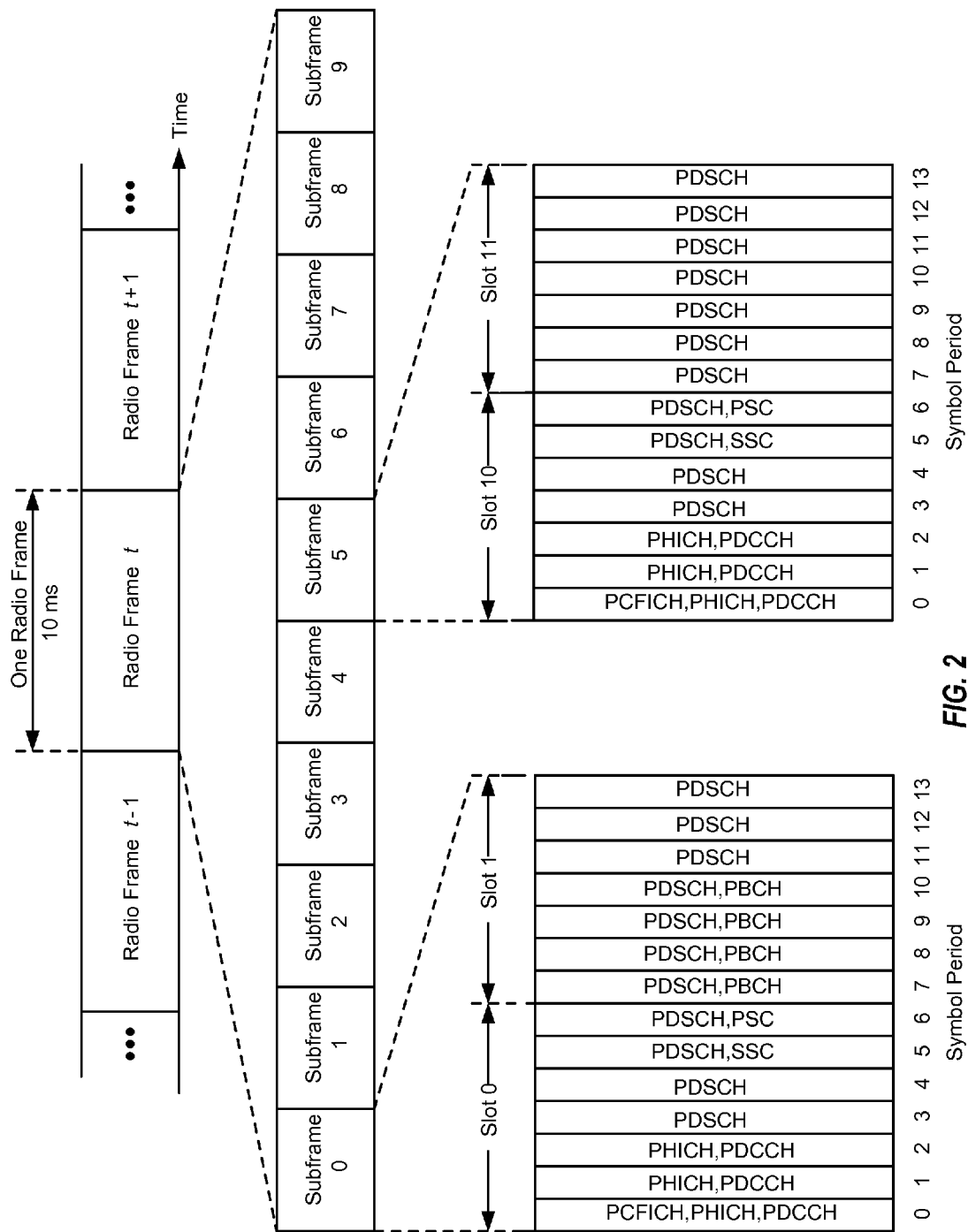
FIG. 2 is a diagram conceptually illustrating an example of a downlink frame structure in a telecommunications system.

FIG. 2 shows a downlink FDD frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to groups of UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
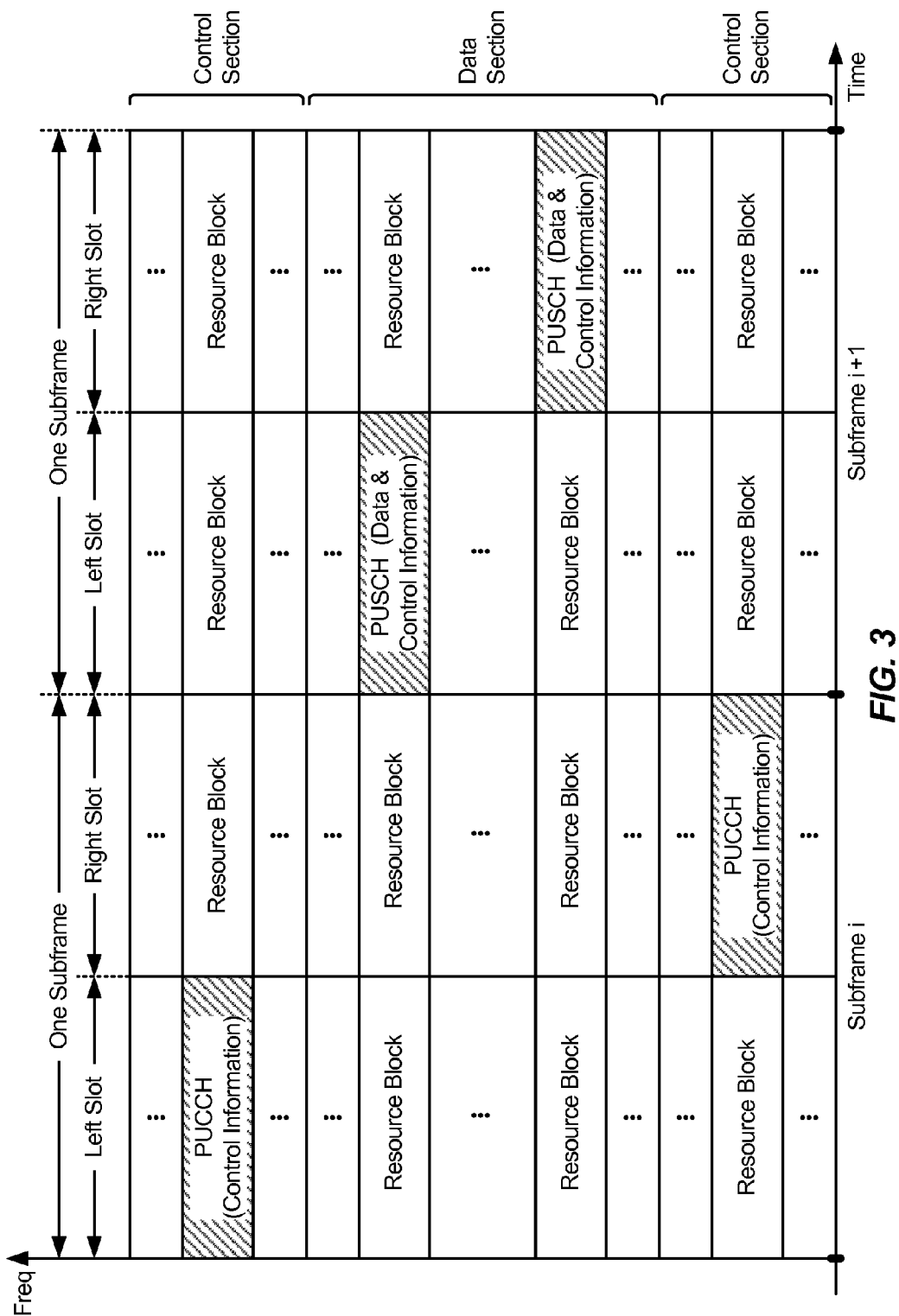
FIG. 3 is a block diagram conceptually illustrating an example frame structure in uplink communications.

FIG. 3 is a block diagram conceptually illustrating an exemplary FDD and TDD (non-special subframe only) subframe structure in uplink long term evolution (LTE) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNodeB. The UE may also be assigned resource blocks in the data section to transmit data to the eNode B. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3. According to one aspect, in relaxed single carrier operation, parallel channels may be transmitted on the UL resources. For example, a control and a data channel, parallel control channels, and parallel data channels may be transmitted by a UE.

The PSC, SSC, CRS, PBCH, PUCCH, PUSCH, and other such signals and channels used in LTE/-A are described in 3GPP TS 36.211, entitled "Evolved Universal Terrestrial Radio Access (E-UTRA); Physical Channels and Modulation," which is publicly available.

Figure 4:
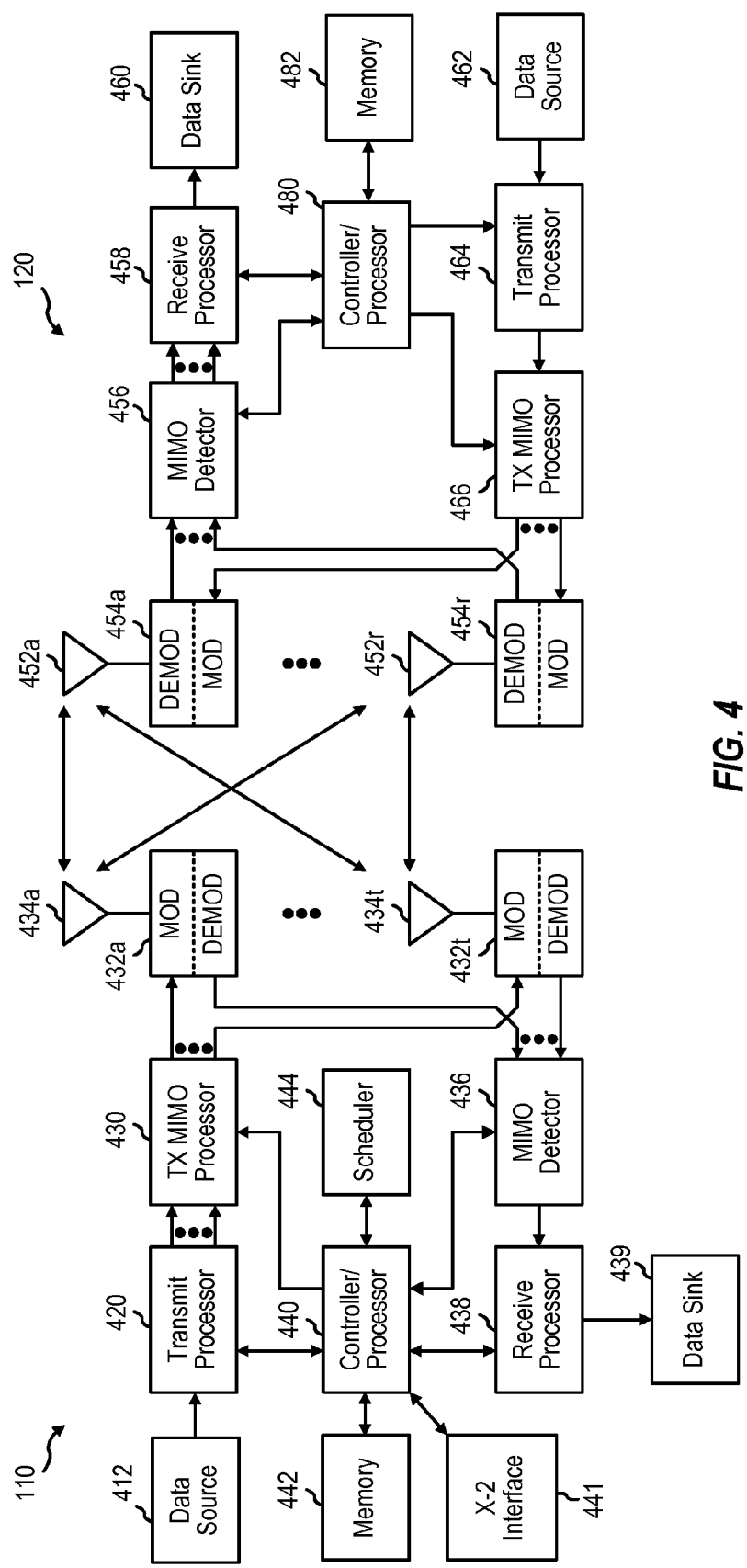
FIG. 4 is a block diagram conceptually illustrating a design of a base station/eNodeB and a UE configured according to one aspect of the present disclosure.

FIG. 4 shows a block diagram of a design of a base station/eNodeB 110 and a UE 120, which may be one of the base stations/eNodeBs and one of the UEs in FIG. 1. The base station 110 may be the macro eNodeB 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the modulators 454a through 454r (e.g., for SC-FDM, etc.), and transmitted to the base station 110. At the base station 110, the uplink signals from the UE 120 may be received by the antennas 434, processed by the demodulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440. The base station 110 can send messages to other base stations, for example, over an X2 interface 441.

The controllers/processors 440 and 480 may direct the operation at the base station 110 and the UE 120, respectively. The processor 440 and/or other processors and modules at the base station 110 may perform or direct the execution of various processes for the techniques described herein. The processor 480 and/or other processors and modules at the UE 120 may also perform or direct the execution of the functional blocks illustrated in FIGS. 9A-9B, and/or other processes for the techniques described herein. The memories 442 and 482 may store data and program codes for the base station 110 and the UE 120, respectively. A scheduler 444 may schedule UEs for data transmission on the downlink and/or uplink.

Figure 5:
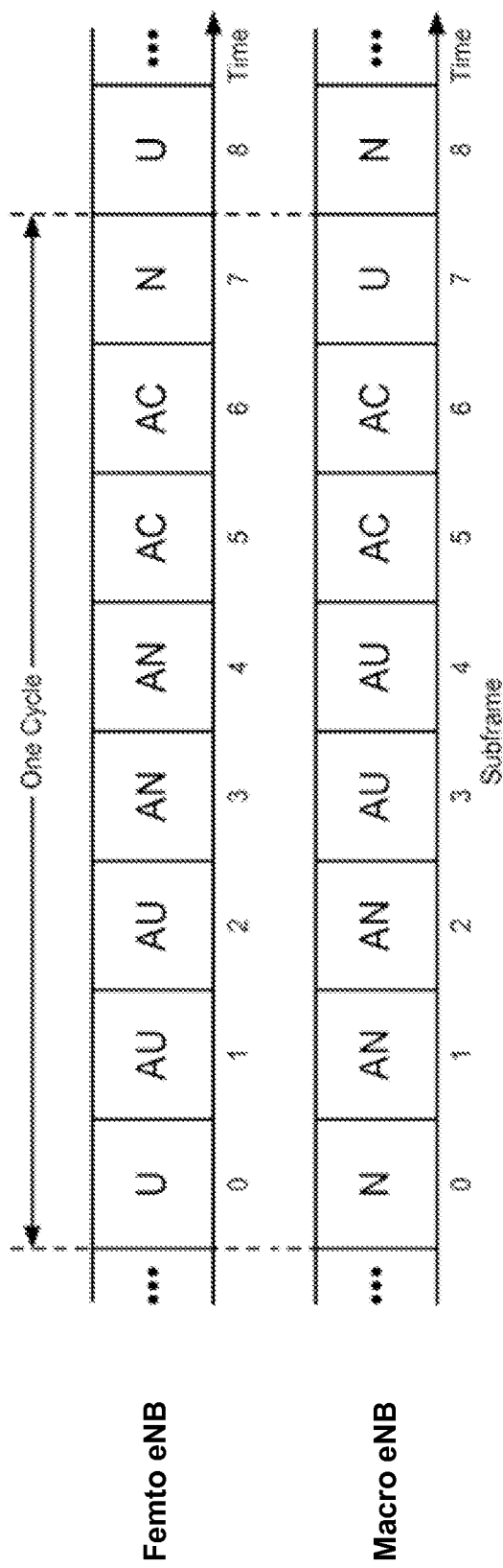
FIG. 5 is a block diagram conceptually illustrating adaptive resource partitioning in a heterogeneous network according to one aspect of the present disclosure.

FIG. 5 is a block diagram illustrating TDM partitioning in a heterogeneous network according to one aspect of the disclosure. A first row of blocks illustrate sub frame assignments for a femto eNodeB, and a second row of blocks illustrate sub frame assignments for a macro eNodeB. Each of the eNodeBs has a static protected sub frame during which the other eNodeB has a static prohibited sub frame. For example, the femto eNodeB has a protected sub frame (U sub frame) in sub frame 0 corresponding to a prohibited sub frame (N sub frame) in sub frame 0. Likewise, the macro eNodeB has a protected sub frame (U sub frame) in sub frame 7 corresponding to a prohibited sub frame (N sub frame) in sub frame 7. Sub frames 1-6 are dynamically assigned as either protected sub frames (AU), prohibited sub frames (AN), and common sub frames (AC). During the dynamically assigned common sub frames (AC) in sub frames 5 and 6, both the femto eNodeB and the macro eNodeB may transmit data.

Protected sub frames (such as U/AU sub frames) have reduced interference and a high channel quality because aggressor eNodeBs are prohibited from transmitting. Prohibited sub frames (such as N/AN sub frames) have no data transmission to allow victim eNodeBs to transmit data with low interference levels. Common sub frames (such as C/AC sub frames) have a channel quality dependent on the number of neighbor eNodeBs transmitting data. For example, if neighbor eNodeBs are transmitting data on the common sub frames, the channel quality of the common sub frames may be lower than the protected sub frames. Channel quality on common sub frames may also be lower for extended boundary area (EBA) UEs strongly affected by aggressor eNodeBs. An EBA UE may belong to a first eNodeB but also be located in the coverage area of a second eNodeB. For example, a UE communicating with a macro eNodeB that is near the range limit of a femto eNodeB coverage is an EBA UE.

Another example interference management scheme that may be employed in LTE/-A is the slowly-adaptive interference management. Using this approach to interference management, resources are negotiated and allocated over time scales that are much larger than the scheduling intervals. The goal of the scheme is to find a combination of transmit powers for all of the transmitting eNodeBs and UEs over all of the time or frequency resources that maximizes the total utility of the network. "Utility" may be defined as a function of user data rates, delays of quality of service (QoS) flows, and fairness metrics. Such an algorithm can be computed by a central entity that has access to all of the information used for solving the optimization and has control over all of the transmitting entities, such as, for example, the network controller 130 (FIG. 1). This central entity may not always be practical or even desirable. Therefore, in alternative aspects a distributed algorithm may be used that makes resource usage decisions based on the channel information from a certain set of nodes. Thus, the slowly-adaptive interference algorithm may be deployed either using a central entity or by distributing the algorithm over various sets of nodes/entities in the network.

In deployments of heterogeneous networks, such as the wireless network 100, a UE may operate in a dominant interference scenario in which the UE may observe high interference from one or more interfering eNodeBs. A dominant interference scenario may occur due to restricted association. For example, in FIG. 1, the UE 120y may be close to the femto eNodeB 110y and may have high received power for the eNodeB 110y. However, the UE 120y may not be able to access the femto eNodeB 110y due to restricted association and may then connect to the macro eNodeB 110c (as shown in FIG. 1) or to the femto eNodeB 110z also with lower received power (not shown in FIG. 1). The UE 120y may then observe high interference from the femto eNodeB 110y on the downlink and may also cause high interference to the eNodeB 110y on the uplink. When a network supports enhanced interference coordination, the base stations may negotiate with each other to coordinate resources in order to reduce and/or eliminate interference by the interfering cell giving up part of its resources. In particular, using coordinated interference management, the macro eNodeB 110c and the femto eNodeB 110y may communicate over the backhaul to negotiate resources. In the negotiation, the femto eNodeB 110y agrees to cease transmission on one of its channel resources, such that the UE 120y will not experience as much interference from the femto eNodeB 110y as it communicates with the eNodeB 110c over that same channel. By negotiating for the femto eNodeB 110y to yield resources, the macro UE 120y under the femto cell coverage area may still be able to access its serving macro cell 102c using these yielded resources. In a radio access system using OFDM, the yielded resources may be time-based, frequency based, or a combination of both. When the coordinated resource partitioning is time based, the interfering cell may simply not use some of the subframes in the time domain. When the coordinated resource partitioning is frequency based, the interfering may yield subcarriers in the frequency domain. When the coordinated resource partitioning is a combination of both frequency and time, the interfering cell may yield frequency and time resources.

In addition to the discrepancies in signal power observed at the UEs in such a dominant interference scenario, timing delays of downlink signals may also be observed by the UEs, even in synchronous systems, because of the differing distances between the UEs and the multiple eNodeBs. The eNodeBs in a synchronous system are presumptively synchronized across the system. However, for example, considering a UE that is a distance of 5 km from the macro eNodeB, the propagation delay of any downlink signals received from that macro eNodeB would be delayed approximately 16.67 µs (5 km÷3×108, i.e., the speed of light, 'c'). Comparing that downlink signal from the macro eNodeB to the downlink signal from a much closer femto eNodeB, the timing difference could approach the level of a time-to-live (TTL) error.

Additionally, such timing difference may impact the interference cancellation at the UE. Interference cancellation often uses cross correlation properties between a combination of multiple versions of the same signal. By combining multiple copies of the same signal, interference may be more easily identified because, while there will likely be interference on each copy of the signal, it will likely not be in the same location. Using the cross correlation of the combined signals, the actual signal portion may be determined and distinguished from the interference, thus, allowing the interference to be canceled.

Power classes may vary among different eNodeBs. For example, macro cells may have a nominal transmit power of 46 dBm, pico cells may have a nominal transmit power of 30 dBm, and femto cells may have a nominal transmit power of 21 dBm. While all UEs can attach to macro and pico cells, only selected UEs can attach to femto cells.

Although in this disclosure, examples of macro and femto cell interference management are illustrated and described, the potential interference could come from other users associated with a pico cell, another femto cell, a relay, a WiFi access terminal, or a Bluetooth transceiver, etc.

Due to the transmit power differences between the macro and femto cells, a UE can cause high interference to a femto cell before it discovers the femto cell or before the UE declares radio link failure (RLF). Due to the approximate 18 dB transmit power difference between the macro and femto UE, when the UE receives the same downlink power from the macro and/or the femto cell, the UE will have higher uplink interference to the femto cell. A release 8 UE will not be able to perform advanced ICIC schemes. As the Release 8 UE moves closer and closer to the femto cell, the downlink interference will become stronger. When the downlink interference is too strong, the UE will declare radio link failure and lose the connection to the network. TDM resource partitioning is one way to reduce downlink interference, but even with TDM partitioning, the uplink interference may continue.

For Release 8 UEs, the default periodicity of certain channels (e.g., CQI (channel quality indicator), SRS (sounding reference signals), and SR (scheduling request)) are not multiples of 8, and the channels may be transmitted on the femto eNodeB's protected subframes (i.e., the U subframes) at certain intervals. The femto eNodeB may suffer interference from such control channels while a Release 8 macro UE is in the vicinity.

In the heterogeneous environment, a strong jammer may interfere with some subframes, but not be present in other subframes. This may indicate different power control loops, rate control loops, erasure statistics, and radio link monitoring (RLM), depending on the interference conditions. Aspects of the present disclosure utilize noise padding to address the interference conditions. Noise padding techniques may be utilized to normalize received signals. In one aspect, noise padding may be triggered upon detection of a strong jammer and exponential padding decay may be utilized to transition out of noise padding as the jammer moves away. Because the femto base station may not know when the jammer will go away and cease interfering, exponential padding decay allows the noise padding to be gradually decreased once noise padding has been triggered and the triggering events have disappeared.

In one example, the use of noise padding may simplify the control loops. Additionally, the signal-to-noise ratio and input signal variations may be decreased or minimized. In general, noise padding may be used at the eNodeB side to prevent high interference variations. Additionally, noise padding may be applied to the UE side as well, for example, to prevent a large AGC (automatic gain control) swing when there are strong interference variations.

The noise padding may be triggered by various events. For example, noise padding may be triggered by explicitly exchanged information among eNodeBs about potential interferers. For other aspects, noise padding may be triggered by eNodeB measurements or learning of interference level changes.

Additionally, the noise padding may be discontinued by various means. For example, the noise padding may be deactivated by explicitly exchanged information among eNodeBs about interference information, by measurements observing disappearance of the interferer, or according to some function, e.g., an exponentially decaying function after the interference has disappeared.

Figure 6A:
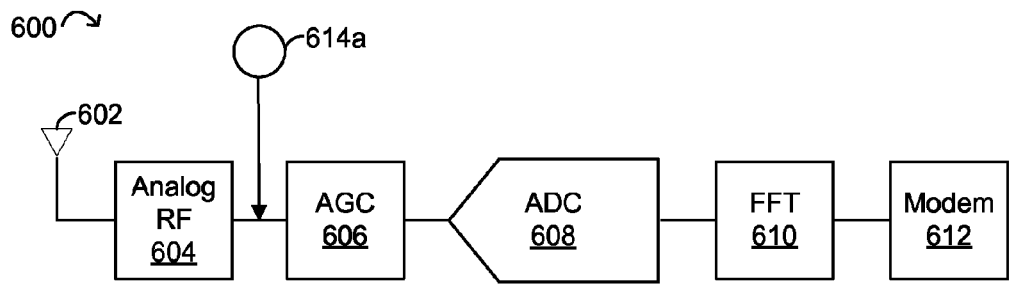
FIGS. 6A-6C illustrate noise padding at different points in a receiver front end of a femto base station according to aspects of the present disclosure.
Figure 6B:
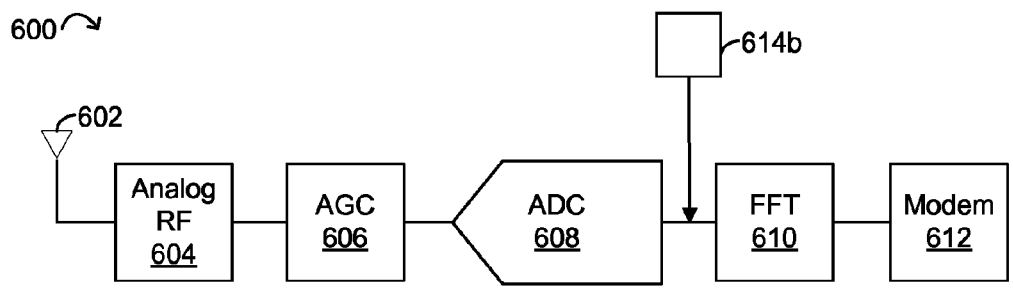
Figure 6C:
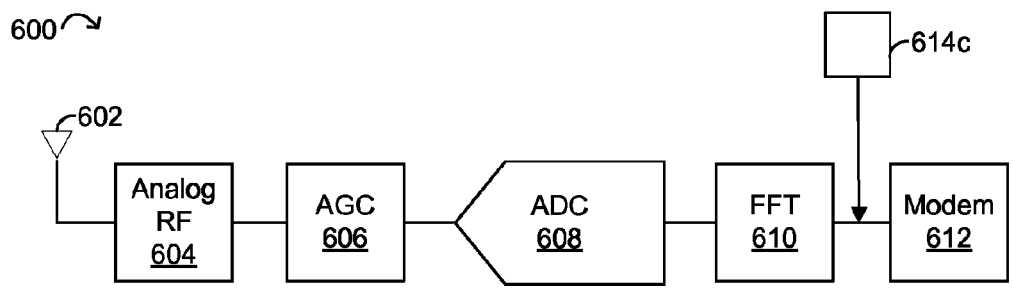

In one example, noise padding is applied to the received uplink transmission at the femto base station. FIGS. 6A-6C illustrate examples of a receiver end of the femto base station 110c and various applications of noise padding. The receiver end of the femto base station may include an antenna port 602, analog radio frequency (RF) circuitry 604, automatic gain compensation (AGC) circuitry 606, an analog-to-digital converter (ADC) 608, fast Fourier transform (FFT) circuitry 610, and a modem 612.

In one example, noise padding may be performed in the time domain. For example, FIG. 6A illustrates noise padding injection 614a performed before the AGC circuit 606 in the analog domain. Additionally, FIG. 6B illustrates an alternate example where a noise padding injection 614b occurs before the FFT circuit 610 in the digital domain. For these aspects, white or Gaussian noise (vn) may be injected in the time domain. In another example, noise padding may be performed in the frequency domain. For example, FIG. 6C illustrates a noise padding injection 614c performed in the frequency domain, after the FFT circuit 610. Noise padding in the frequency domain may be performed selectively, and the selection may be based on one or more criteria. For certain aspects, the noise padding may be channel-dependent, where noise padding may be performed on certain channels, but not others. For other aspects, the noise padding may be subband-dependent for fractional frequency reuse, where noise may be added to certain subbands, but not others. In one example, in a 5 MHz subframe bandwidth divided into four subbands, noise may be injected into a first and second subbands, but not applied to the third and fourth subbands.

In some examples for noise padding in the frequency domain, the macro cell may communicate with the femto cell via the network backbone and provide the femto cell with the channel or subband information. For other embodiments, the femto cell may learn the channels or subbands to which to add noise based on measured interference levels. For example, in an apartment building, a femto cell may learn an interfering neighbor's WiFi access terminal's band and apply interference to this band.

Certain aspects of the present disclosure may employ virtual noise padding. Rather than injecting noise, the femto base station may perform power control and/or rate control based on the worst interference scenario, but allow early termination to take advantage of an interference-free subframe. For certain aspects, once the femto base station observes high interference, it artificially uses more conservative control loop updates. For other aspects, the femto base station may use completely different control loop parameters with or without interference.

For certain aspects, the noise padding may be performed on a per-subframe or a per-time division multiplexed (TDM) partition basis. For example, the femto base station may only apply padding to a subframe where the eNodeB is not certain of the subframe interference level, such as an AC subframe.

Figure 7:
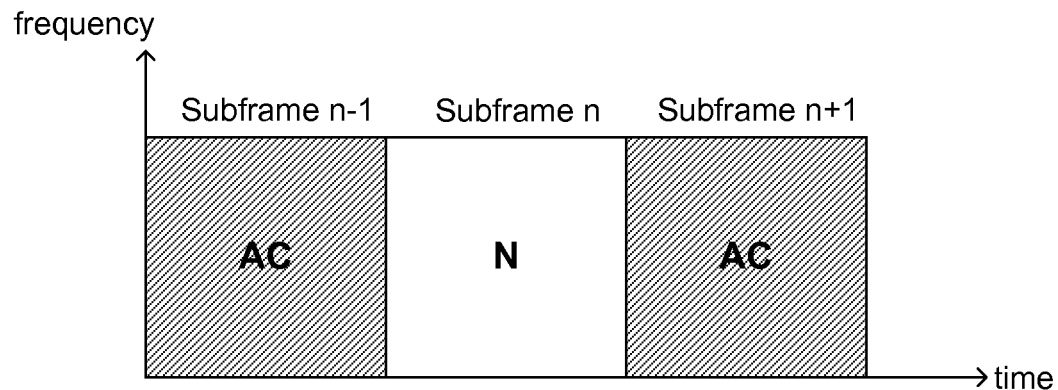
FIG. 7 is an example illustrating subframe-based noise padding according to one aspect of the present disclosure.

As an example of subframe-based noise padding, FIG. 7 illustrates adding noise to subframes n−1 and n+1, but not to subframe n.

For subframe-based or TDM-partition-based noise padding, the macro cell may communicate with the femto cell via the network backbone and provide the femto cell with the subframe or TDM partition information. For other embodiments, the femto cell may learn the subframes or TDM partitions to which to add noise based on measured interference levels.

Figure 8A:
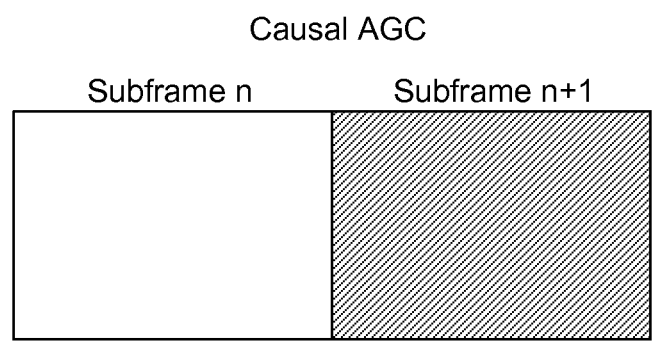
FIGS. 8A-8B illustrate examples of casual and non-causal automatic gain compensation (AGC) with noise padding according to aspects of the present disclosure.

For certain aspects, noise padding may use causal or non-causal automatic gain control (AGC). FIG. 8A illustrates an example of causal AGC. In particular, the interference of subframe n is determined, and then noise padding may be applied to the subsequent subframe n+1 based on the interference determined for subframe n. In one example, causal AGC does not implement a delay and buffering.

Figure 8B:
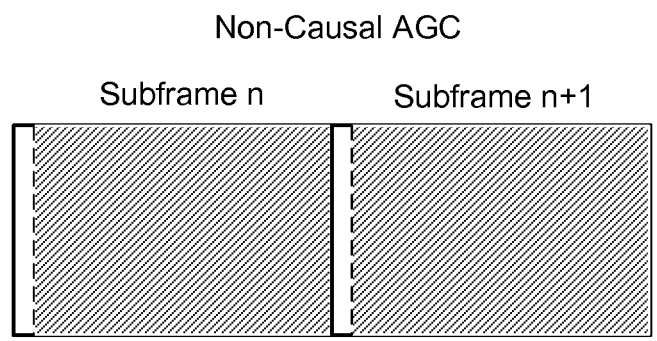

In contrast, FIG. 8B illustrates noise padding using non-causal AGC. The interference of a first portion of subframe n (e.g., a first symbol of subframe n) may be determined Noise padding may then be applied to a remaining portion of subframe n based on the interference determined for the first portion of subframe n. In the subsequent subframe n+1, the interference of a first portion of the subframe n+1 (e.g., a first symbol of subframe n+1) may also be determined Subsequently, noise padding may be applied to a remaining portion of the subframe n+1 based on the interference determined for the first portion of subframe n+1.

For certain aspects, noise padding may be performed according to release type. In particular, noise padding may be performed depending on whether the received uplink transmission is from a Release 8 or a Release 10 UE. In other words, if UEs are partitioned between Release 8 and Release 10 in time, space, and/or frequency in some manner, noise padding may be selectively applied to the received uplink transmissions from only the Release 8 UEs, or a subset of them.

For noise padding performed according to release type, (e.g., Release 8 or Release 10), the macro cell may communicate with the femto cell via the network backbone and provide the femto cell with the relevant information. For other embodiments, the femto cell may learn which of the UEs are Release 8 UEs and add noise only to uplink transmissions from them.

Figures 9A, 9B:
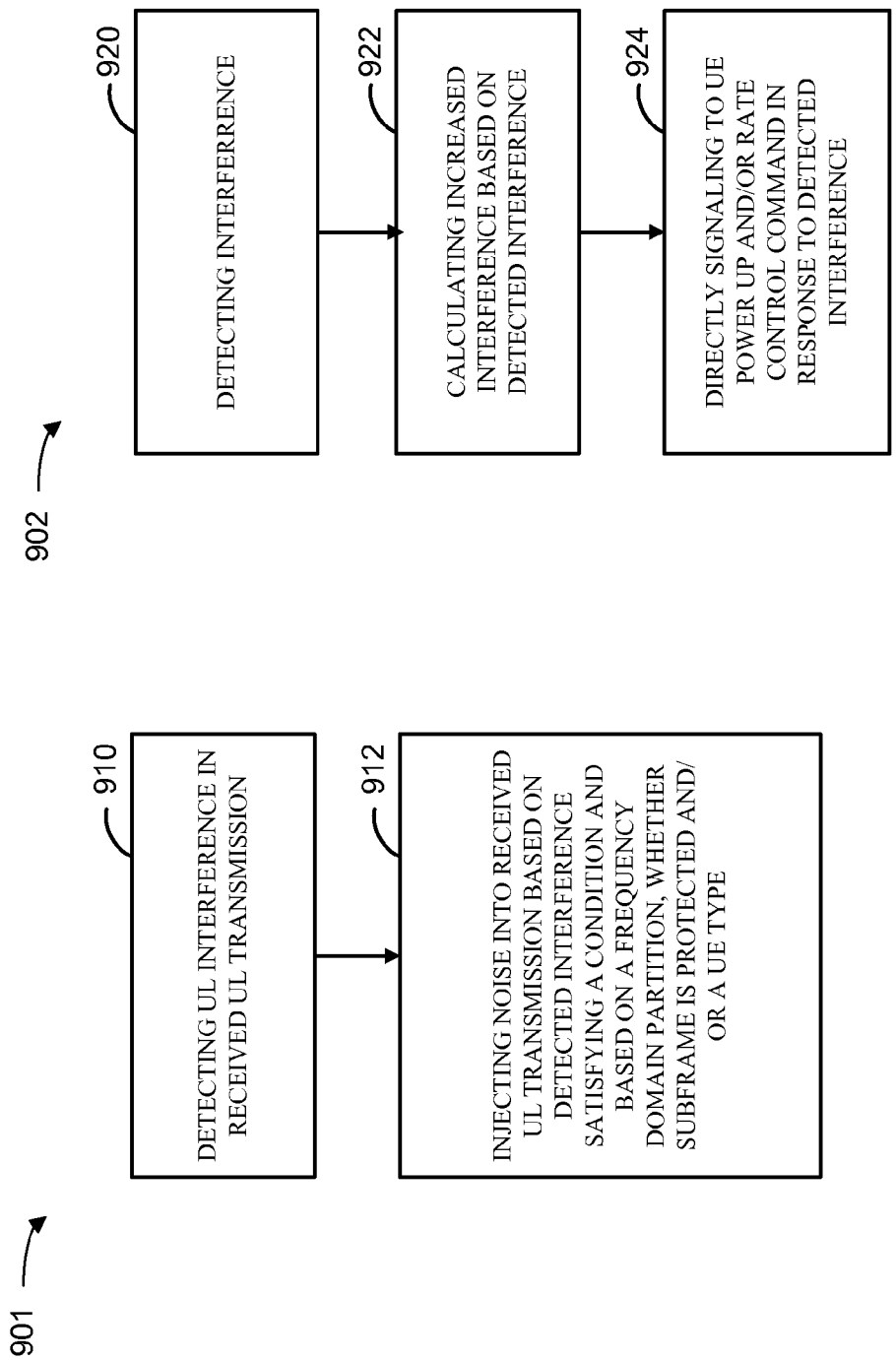
FIGS. 9A-9B are block diagrams illustrating methods for applying noise padding techniques in heterogeneous wireless networks.

FIG. 9A illustrates a method 901 for adding noise to communications in a heterogeneous network. In block 910, uplink interference is detected in a received uplink transmission. In block 912, noise is injected into the received uplink transmission based on the detected interference satisfying a condition and based on a frequency domain partition, whether a subframe is protected and/or a user equipment type. FIG. 9B illustrates a method 902 for applying virtual noise padding. In block 920 interference is detected in an uplink transmission. An increased interference is calculated, in block 922, based on the detected interference. A power up command and/or rate control command is directly signaled to a UE in response to the detected uplink transmission, in block 922.

In one configuration, the eNodeB 110 is configured for wireless communication including means for detecting uplink interference. In one aspect, the detecting means may be the receive processor 438 configured to perform the functions recited by the detecting means. The eNodeB 110 is also configured to include a means for injecting noise into the received uplink transmission. In one aspect, the injecting means may be the receiver processor 438 configured to perform the functions recited by the transmitting means. In another aspect, the aforementioned means may be a module or any apparatus configured to perform the functions recited by the aforementioned means.

In one configuration, the eNodeB 110 is also configured for wireless communication including a means for detecting uplink interference. In one aspect, the detecting means may be the receive processor 438 configured to perform the functions recited by the detecting means. The eNodeB 110 is also configured to include a means for calculating increased interference. In one aspect, the calculating means may be the receive processor 438 configured to perform the functions. The eNodeB 110 is also configured to include a means for directly signaling to a UE. In one aspect, the signaling means may be the transmit processor 420 configured to perform the functions recited by the signaling means. In another aspect, the aforementioned means may be a module or any apparatus configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   detecting, by a base station, uplink interference in a first portion of a received uplink transmission of a user equipment (UE); and
   noise padding a second portion of the received uplink transmission to reduce interference variation between the first portion and the second portion based on the detected uplink interference and based on at least one of a frequency domain partition, whether a subframe is protected, and user equipment type, wherein the second portion of the received uplink transmission is different than the first portion of the received uplink transmission.

2. The method of claim 1, in which the noise padding includes injecting noise into the second portion of the received uplink transmission.

3. The method of claim 1, in which the noise padding triggers at least one of instructing power control of the UE and controlling a transmission rate of the UE.

4. The method of claim 1, in which the noise padding comprises decreasing input signal variation, due to interference, at a receiver front end of the base station.

5. The method of claim 1, in which the noise padding is based on a time domain partition and occurs in the second portion of a same time period as when the uplink interference is detected, wherein the second portion of the received uplink transmission is a subsequent portion to the first portion of the received uplink transmission.

6. The method of claim 1, in which the noise padding is based on a time domain partition and occurs in a subsequent time period after the uplink interference is detected.

7. The method of claim 1, in which the noise padding is based on the frequency domain partition and comprises injecting noise into a first channel of the received uplink transmission, but not to a second channel, the first channel being included in the second portion and the second channel being included in the first portion.

8. The method of claim 1, in which the noise padding is based on the frequency domain partition and comprises injecting noise into a first subband of the received uplink transmission, but not to a second subband, the first subband being included in the second portion and the second subband being included in the first portion.

9. A method for virtual noise padding in a wireless communication, comprising:
   detecting, by a base station, uplink interference in a first portion of an uplink transmission;
   calculating an increased interference for a second portion of the uplink transmission based on the detected uplink interference; and
   directly signaling to a user equipment (UE) at least one of a power control command and a rate control command in response to the calculated interference to reduce interference variation between the first portion and the second portion, wherein the second portion of the received uplink transmission is different than the first portion of the received uplink transmission.

10. A apparatus for wireless communication, comprising:
    means for detecting uplink interference in a first portion of a received uplink transmission of a user equipment (UE); and
    means for noise padding a second portion of the received uplink transmission to reduce interference variation between the first portion and the second portion based on the detected uplink interference, and based on at least one of a frequency domain partition, whether a subframe is protected, and user equipment type, wherein the second portion of the received uplink transmission is different than the first portion of the received uplink transmission.

11. An apparatus for virtual noise padding in a wireless communication, comprising:
    means for detecting uplink interference in a first portion of an uplink transmission;
    means for calculating an increased interference for a second portion of the uplink transmission based on the detected uplink interference; and
    means for directly signaling to a user equipment (UE) at least one of a power control command and a rate control command in response to the calculated interference to reduce interference variation between the first portion and the second portion, wherein the second portion of the received uplink transmission is different than the first portion of the received uplink transmission.

12. A computer program product for wireless communication in a wireless network, comprising:
    a non-transitory computer-readable medium having a program code recorded thereon, the program code comprising:
    program code to detect uplink interference in a first portion of a received uplink transmission of a user equipment (UE); and
    program code to noise pad a second portion of the received uplink transmission to reduce interference variation between the first portion and the second portion, based on the detected uplink interference and based on at least one of a frequency domain partition, whether a subframe is protected, and user equipment type, wherein the second portion of the received uplink transmission is different than the first portion of the received uplink transmission.

13. A computer program product for virtual noise padding in a wireless communication, comprising:
a non-transitory computer-readable medium having a program code recorded thereon, the program code comprising:
program code to detect uplink interference in a first portion of an uplink transmission;
program code to calculate an increased interference for a second portion of the uplink transmission based on the detected uplink interference; and
program code to directly signal to a user equipment (UE) at least one of a power control command and a rate control command in response to the calculated interference to reduce interference variation between the first portion and the second portion, wherein the second portion of the received uplink transmission is different than the first portion of the received uplink transmission.

14. A system for wireless communication, comprising:
a memory; and
at least one processor coupled to the memory, the at least one processor being configured:
to detect uplink interference in a first portion of a received uplink transmission of a user equipment (UE); and
to noise pad a second portion of the received uplink transmission to reduce interference variation between the first portion and the second portion based on the detected uplink interference and based on at least one of a frequency domain partition, whether a subframe is protected, and user equipment type, wherein the second portion of the received uplink transmission is different than the first portion of the received uplink transmission.

15. The method of claim 14, in which the noise padding includes injecting noise into the second portion of the received uplink transmission.

16. The system of claim 14, in which the noise padding triggers at least one of instructing power control of the UE and controlling a transmission rate of the UE.

17. The system of claim 14, in which the processor configured to noise pad is further configured to decrease input signal variation, due to interference, at a receiver front end of a base station.

18. The system of claim 14, in which the noise padding is based on a time domain partition and occurs in the second portion of a same time period as when the uplink interference is detected, wherein the second portion of the received uplink transmission is a subsequent portion to the first portion of the received uplink transmission.

19. The system of claim 14, in which the noise padding is based on a time domain partition and occurs in a subsequent time period after the uplink interference is detected.

20. The system of claim 14, in which the noise padding is based on the frequency domain partition and comprises injecting noise into a first channel of the received uplink transmission, but not to a second channel, the first channel being included in the second portion and the second channel being included in the first portion.

21. The system of claim 14, in which the noise padding is based on the frequency domain partition and comprises injecting noise into a first subband of the received uplink transmission, but not to a second subband, the first subband being included in the second portion and the second subband being included in the first portion.

22. A system for virtual noise padding in a wireless communication, comprising:
a memory; and
at least one processor coupled to the memory, the at least one processor being configured:
to detect uplink interference in a first portion of an uplink transmission;
to calculate an increased interference for a second portion of the uplink transmission based on the detected uplink interference; and
to directly signal to a user equipment (UE) at least one of a power control command and a rate control command in response to the calculated interference to reduce interference variation between the first portion and the second portion, wherein the second portion of the received uplink transmission is different than the first portion of the received uplink transmission.

* * * * *